(12) United States Patent
Kim

(10) Patent No.: US 8,091,440 B2
(45) Date of Patent: Jan. 10, 2012

(54) NON-DESTRUCTIVE TEST APPARATUS

(75) Inventor: Young-Kuk Kim, Busan (KR)

(73) Assignee: Korea Plant Service & Engineering Co., Ltd., Gyeonggi-do (KR)

( * ) Notice: Subject to any disclaimer, the term of this patent is extended or adjusted under 35 U.S.C. 154(b) by 427 days.

(21) Appl. No.: 12/437,786

(22) Filed: May 8, 2009

(65) Prior Publication Data

US 2010/0095748 A1  Apr. 22, 2010

(30) Foreign Application Priority Data

Oct. 16, 2008 (KR) .................. 10-2008-0101516

(51) Int. Cl.
*G01N 15/08* (2006.01)

(52) U.S. Cl. ............. 73/865.8; 73/37; 73/38; 73/866.5; 211/190

(58) Field of Classification Search ............... 73/37–38, 73/40, 865.8, 866, 866.5; 211/189–206; 294/18.1–81.62
See application file for complete search history.

(56) References Cited

U.S. PATENT DOCUMENTS

| | | | | |
|---|---|---|---|---|
| 1,616,743 A | * | 2/1927 | Ericsson | 182/132 |
| 3,524,342 A | * | 8/1970 | Hobbs | 73/40 |
| 3,808,876 A | * | 5/1974 | Kershaw | 73/38 |
| 3,827,283 A | * | 8/1974 | Lerner et al. | 73/40 |
| 3,889,521 A | * | 6/1975 | Jakimowicz | 73/38 |
| 4,467,648 A | * | 8/1984 | Sasaki | 73/866.5 |
| 4,498,556 A | * | 2/1985 | Garton | 182/19 |
| 4,756,183 A | * | 7/1988 | Rajala et al. | 73/38 |
| 4,910,997 A | * | 3/1990 | Cook | 73/37 |
| 4,979,390 A | * | 12/1990 | Schupack et al. | 73/38 |
| 5,163,333 A | * | 11/1992 | Brubaker et al. | 73/865.8 |
| 5,257,088 A | * | 10/1993 | Tyson et al. | 356/520 |
| 5,318,254 A | * | 6/1994 | Shaw et al. | 244/134 C |
| 5,503,033 A | * | 4/1996 | Van Niekerk | 73/865.8 |
| 5,574,233 A | * | 11/1996 | Oliver et al. | 73/865.8 |
| 5,643,476 A | * | 7/1997 | Garmire et al. | 219/121.68 |
| 5,858,111 A | * | 1/1999 | Marrero | 134/6 |
| 6,477,730 B1 | * | 11/2002 | Marrero | 15/53.1 |
| 6,637,266 B1 | * | 10/2003 | Froom | 73/583 |

(Continued)

FOREIGN PATENT DOCUMENTS

JP            63015132 A  *  1/1988

(Continued)

*Primary Examiner* — David A. Rogers

(74) *Attorney, Agent, or Firm* — Eckert Seamans Cherin & Mellott, LLC

(57) ABSTRACT

The present invention provides a non-destructive test apparatus which can be applied not only to a structure in dry conditions but also to a structure constructed under water or in a location to which it is difficult for a worker to gain access. The non-destructive test apparatus includes a support frame which is disposed adjacent to the target structure and has a vertical guide rail, and a vacuum box which moves upwards or downwards along the guide rail of the support frame. The vacuum box is attached to the target structure and creates a vacuum therein. The non-destructive test apparatus further includes a hoist which is provided on the upper end of the support frame to move the vacuum box upwards or downwards, a fastening unit which fastens the support frame and the vacuum box to the target structure, and a vacuum pump which creates a vacuum in the vacuum box. The non-destructive test apparatus further includes a defect detecting unit which measures a strength of vacuum in the vacuum box to determine whether the target structure is defective, and a control unit which controls the elements.

5 Claims, 5 Drawing Sheets

U.S. PATENT DOCUMENTS

| | | | | |
|---|---|---|---|---|
| 6,646,431 | B1 * | 11/2003 | Parvez et al. | 324/750.22 |
| 6,792,809 | B1 * | 9/2004 | Moore | 73/618 |
| 6,907,799 | B2 * | 6/2005 | Jacobsen et al. | 73/865.8 |
| 7,716,989 | B2 * | 5/2010 | Kollgaard | 73/627 |
| 7,765,853 | B2 * | 8/2010 | Safai et al. | 73/40 |
| 2003/0043964 | A1 * | 3/2003 | Sorenson | 378/58 |
| 2003/0177850 | A1 * | 9/2003 | Whittington | 73/865.8 |
| 2004/0227534 | A1 * | 11/2004 | Mueller | 324/758 |
| 2005/0056105 | A1 * | 3/2005 | Delacroix et al. | 73/865.8 |
| 2009/0126493 | A1 * | 5/2009 | Moore et al. | 73/618 |
| 2009/0308139 | A1 * | 12/2009 | Fox | 73/40 |

FOREIGN PATENT DOCUMENTS

| | | |
|---|---|---|
| JP | 02002933 A * | 1/1990 |
| WO | WO 9508095 A1 * | 3/1995 |

* cited by examiner

NON-DESTRUCTIVE TEST APPARATUS

BACKGROUND OF THE INVENTION

1. Field of the Invention

The present invention relates generally to non-destructive test apparatuses and, more particularly, to a non-destructive test apparatus which detects whether a structure is defective using a vacuum leakage testing method and can be applied not only to a structure in dry conditions but also to a structure constructed under water or in a location where it is difficult for a worker to access.

2. Description of the Related Art

Generally, in the case of structures constructed on the ground, such as buildings, because they are in dry conditions, whether the structures are defective or not can be easily tested only by typical non-destructive test methods, such as radiographic tests or ultrasonic tests.

Meanwhile, in the case of structures which are in locations, for example, under water, where it is difficult to test whether the structures are defective or not using the conventional non-destructive test methods, divers have conducted the tests with the naked eye.

However, if a structure has a fine defect, it is very difficult for a worker to investigate the defect with the naked eye. In addition, for example, if it is under water or in a radioactive contaminated area, such as storage space used for nuclear fuel, etc., access of a worker is very restrictive, with the result that it is not easy to conduct the non-destructive test.

SUMMARY OF THE INVENTION

Accordingly, the present invention has been made keeping in mind the above problems occurring in the prior art, and an object of the present invention is to provide a non-destructive test apparatus which can easily test whether a structure is defective, even if the structure is disposed in a location difficult for a worker to gain access to.

In order to accomplish the above object, the present invention provides a non-destructive test apparatus, including: a support frame disposed adjacent to a target structure to be tested for defects, the support frame having a vertical guide rail; a vacuum box moving upwards or downwards along the guide rail of the support frame, the vacuum box being attached to the target structure and creating a vacuum therein; a hoist provided on an upper end of the support frame to move the vacuum box upwards or downwards; a fastening unit fastening the support frame and the vacuum box to the target structure; a vacuum pump to create a vacuum in the vacuum box; a defect detecting unit measuring a strength of vacuum in the vacuum box to determine whether the target structure is defective; and a control unit to control at least one of the support frame, the vacuum box, the hoist, the fastening unit, the vacuum pump and the defect detecting unit.

The non-destructive test apparatus may further include a drain pump to remove water from the vacuum pump under control of the control unit when the vacuum pump is used under water.

The non-destructive test apparatus may further include a position indicating unit to display a position of the vacuum box moving on the support frame under control of the control unit such that a user is able to check the position of the vacuum box.

The fastening unit may include: a first cylinder device to removably fasten the support frame to the target structure; a second cylinder device to removably fasten the vacuum box to the target structure; and a fluid pressure supply unit to supply fluid pressure to the first cylinder device and the second cylinder device.

The non-destructive test apparatus may further include a rotating unit to rotate the vacuum box leftwards or rightwards with respect to the target structure under control of the control unit.

The non-destructive test apparatus of the present invention having the above-mentioned construction can safely and easily test whether a structure is defective, even if the structure is disposed in a location difficult for a worker to gain access to, thus contributing to maintenance of the integrity of the structure.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings. The following embodiment is only one example proposed to facilitate the understanding of the present invention, and those skilled in the art will appreciate that various modifications are possible. Therefore, the scope and spirit of the invention are not limited to the following embodiment.

Figure 1:
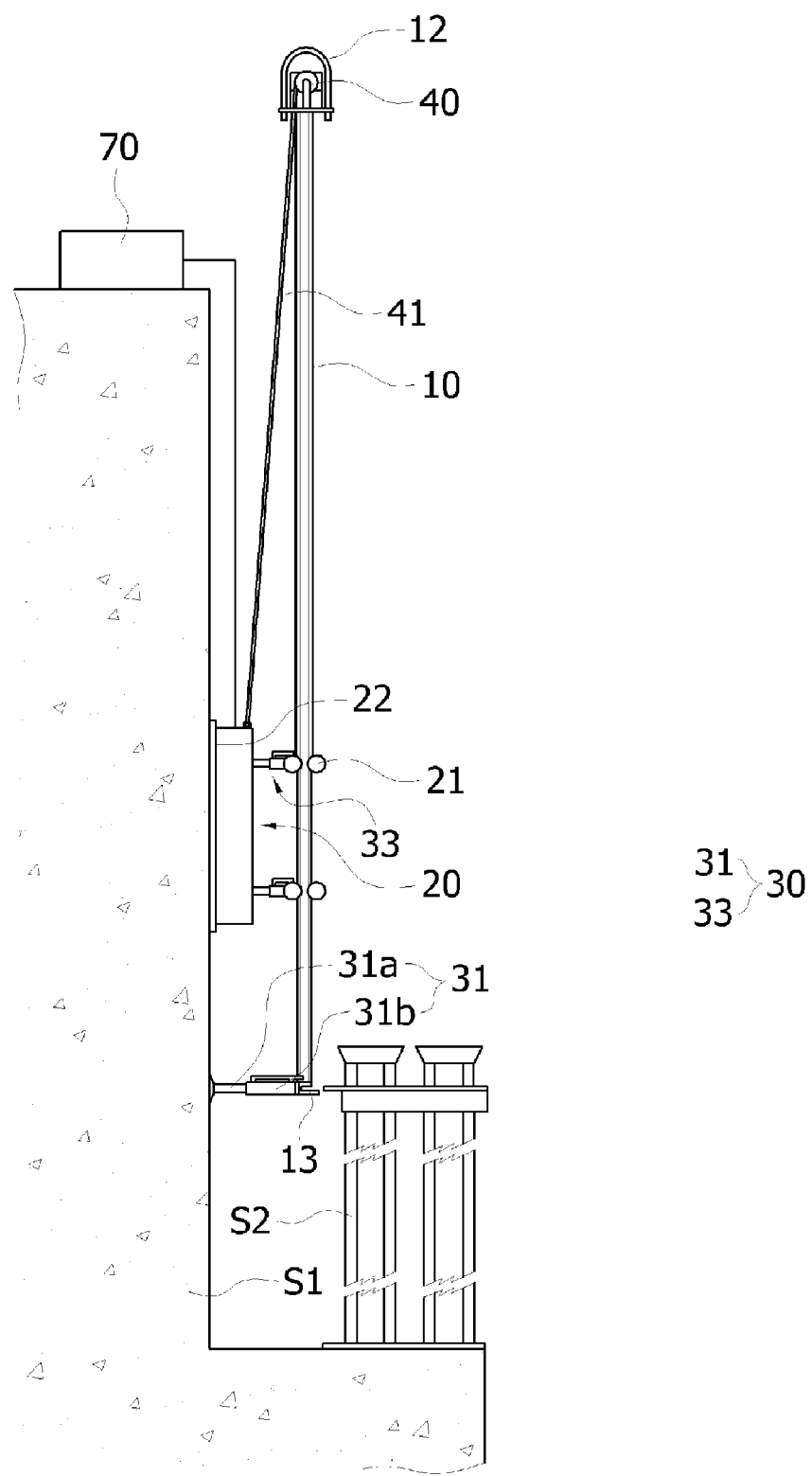
FIG. 1 is a side view showing the installation of a non-destructive test apparatus, according to an embodiment of the present invention.
Figure 2:
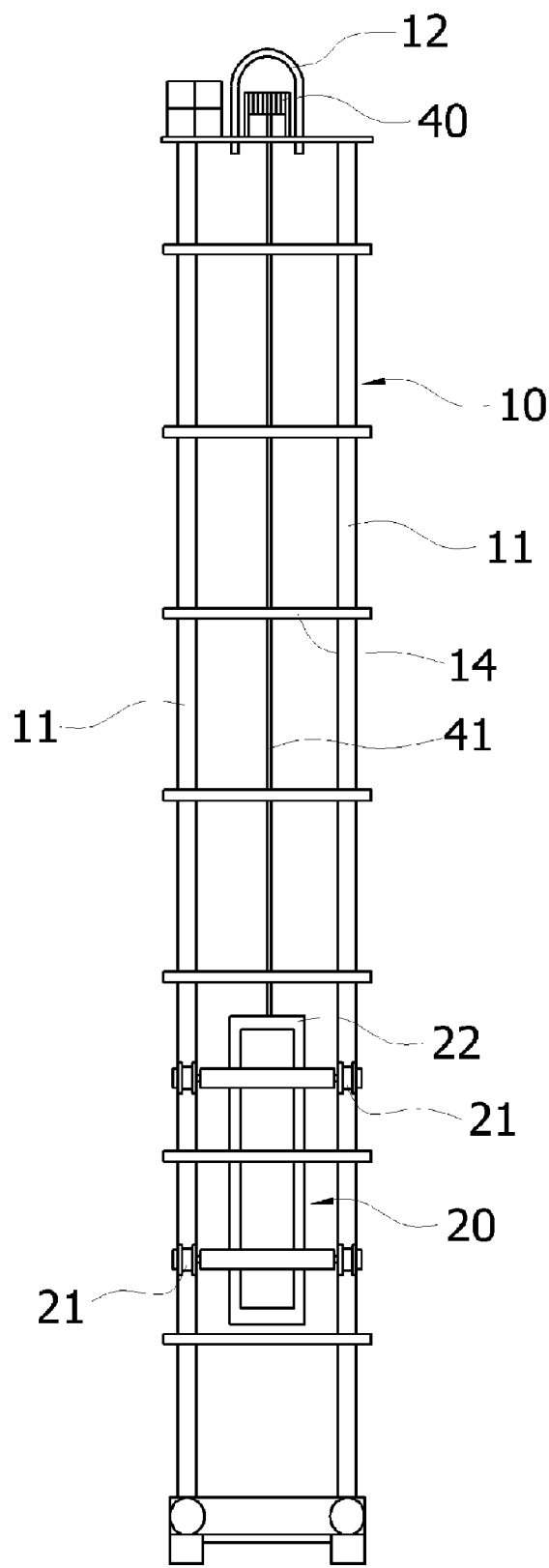
FIG. 2 is a rear view of the non-destructive test apparatus of FIG. 1.
Figure 3:
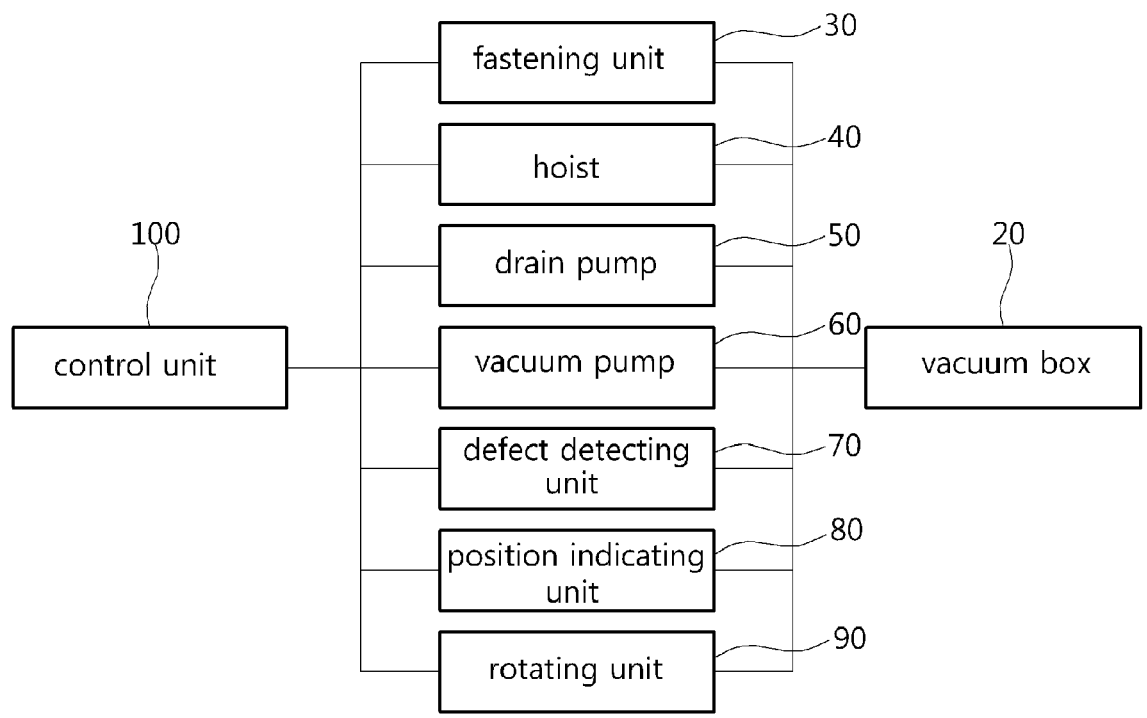
FIG. 3 is a block diagram showing a vacuum box of the non-destructive test apparatus of FIG. 1, elements for operating the vacuum box, and a control unit.

FIG. 1 is a side view showing the installation of a non-destructive test apparatus, according to an embodiment of the present invention. FIG. 2 is a rear view of the non-destructive test apparatus of FIG. 1. FIG. 3 is a block diagram showing a vacuum box 20 of the non-destructive test apparatus of FIG. 1, elements for operating the vacuum box 20, and a control unit 100.

As shown in FIGS. 1 through 3, in the non-destructive test apparatus according to the embodiment of the present invention, a support frame 10 is installed adjacent to a target structure S1 to be tested, and the vacuum box 20 moves upwards or downwards along the support frame 10 to test whether the structure S1 is defective or not. This construction will be described in detail below.

The present invention can be typically used to test whether a structure constructed on the ground is defective or not and, in particular, it can be effectively used to test a structure which is constructed on a location, for example, an underwater location or an area contaminated by radioactivity, to which it is difficult for a worker to gain access. In the embodiment of the present invention, the case where the non-destructive test apparatus is used to test a structure which is under water will be explained.

The support frame 10 includes guide rails 11 which are disposed at left and right positions and extend predetermined lengths in the vertical direction. Furthermore, a holding part 12 which is hooked to a hook of a crane (not shown) is provided on the upper end of the support frame 10. A fastening part 13 is provided on the lower end of the support frame 10, so that the support frame 10 is fastened through the fastening part 13 to a fixture S2 which is around the structure S1. In addition, reinforcing bars 14 made of steel are provided between the guide rails 11 of the support frame 10 at positions spaced apart from each other at regular intervals to prevent the support frame 10, particularly, the guide rails 11, from being deformed. The support frame 10 having the above-mentioned construction is constructed upright using the crane such that it is parallel with the outer wall of the structure S1 that is under water.

Furthermore, the present invention includes a fastening unit 30 which fastens the support frame 10 to the structure S1 to prevent the support frame 10 from undesirably moving due to its own weight or an external force. The fastening unit 30 includes a cylinder actuator 31, and a fluid pressure supply unit (not shown) which supplies fluid pressure to the cylinder device 31. Here, the cylinder device 31 is called the first cylinder device 31 to distinguish it from a second cylinder device 33 which is provided on the vacuum box 20 and will be explained later. In the embodiment of the present invention, pneumatic cylinders are used as the first cylinder device 31 and the second cylinder device 33. A typical air pressure supply unit having a valve, such as a four-way valve, is used as the fluid pressure supply unit. In the state in which the support frame 10 faces the structure S1, a piston rod 31a of the first cylinder device 31 is extracted from a cylinder 31b thereof and is brought into close contact with the outer wall of the structure S1. Simultaneously, the fastening part 31 which is provided on the lower end of the support frame 10 is fastened to the fixture S2 which is around the structure S1. Thereby, the lower end of the support frame 10 is reliably fastened to the structure S without undesirably moving.

Figure 4A:
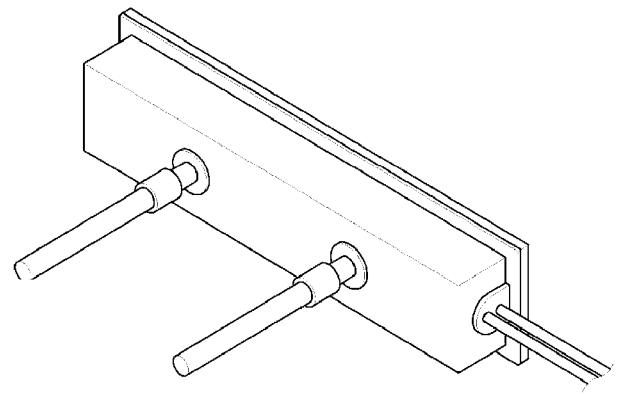
FIGS. 4A through 4C are views showing embodiments of the vacuum box according to the present invention.
Figure 4B:
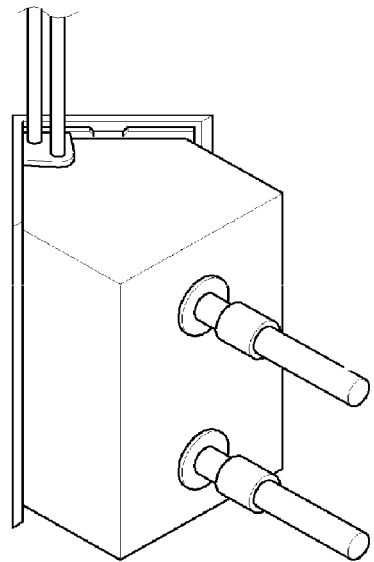
Figure 4C:
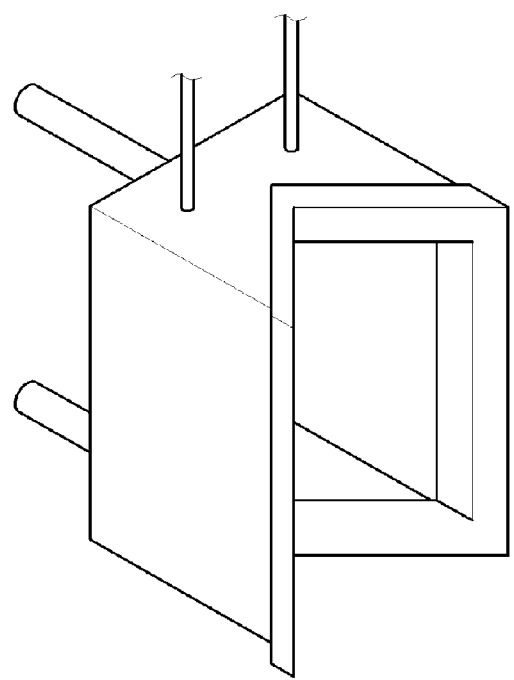

The vacuum box 20 is moved upwards or downwards along the guide rails 11 of the support frame 10. For this, wheels 21 which move along the guide rails 11 are provided on the rear surface of the vacuum box 20. A hoist 40 is provided on the upper end of the support frame 10. The hoist 40 is connected to the vacuum box 20 through a wire 41 to move the vacuum box 20 upwards or downwards. The vacuum box 20 may have various structures depending on the shape of the structure S to be tested. FIGS. 4a, 4b and 4c respectively illustrate examples of shapes corresponding to a planar portion, a concave corner between walls and a convex corner between walls. From among these vacuum boxes 20, one corresponding to the shape of a portion of the structure S1 to be tested is mounted to the support frame 10. As mentioned above, the vacuum box 20 is coupled to the support frame 10 by the second cylinder device 33 constituting the fastening unit 30. To test whether the structure S1 is defective, the second cylinder device 33 is operated by fluid pressure generated from the fluid pressure supply unit, thus bringing the vacuum box 20 into close contact with the outer wall of the structure S1. In particular, a sealing member 22 made of material, such as rubber, is provided on a corresponding side of the vacuum box 20 which comes into contact with the structure S1, such that when the vacuum box 20 is attached to the outer wall of the structure S1, the strength of the vacuum in the vacuum box 20 can be maintained constant.

The vacuum box 20 is hollow. In the state in which the vacuum box 20 is attached to the surface of the structure S1, a vacuum is created therein. To achieve this purpose, the present invention further includes a drain pump 50 which is provided to remove, from the vacuum box 20, water which has been drawn into the vacuum box 20 when the vacuum box 20 was moved downwards along the guide rails 11 of the support frame 10 towards the structure S1 under water. Furthermore, the present invention further includes a vacuum pump 60 which creates a vacuum in the vacuum box 20 as soon as water is removed from the vacuum box 20 by the drain pump 50. If the non-destructive test apparatus of the present invention is applied to a structure constructed on the ground under dry conditions, the drain pump 50 is unnecessary.

If a portion of the structure S1 to which the vacuum box 20 is attached has a defect, for example, a crack, the strength of the vacuum in the vacuum box 20 which has been in the vacuum state is varied. The present invention further includes a defect detecting unit 70 which has a vacuum gauge (not shown) to detect variation in the strength of the vacuum in the vacuum box 20 and to determine whether it is defective.

Furthermore, the present invention may further include a position indicating unit 80 which indicates the position of the vacuum box 20 such that when the vacuum box 20 moves upwards or downwards along the support frame 10, a user can easily observe whether the vacuum box 20 is exactly disposed at a target position of the structure S1 to be tested. The position indicating unit 80 includes a typical camera which is provided at a predetermined position on the support frame 10, and a monitor which displays images transmitted from the camera.

Figure 5:
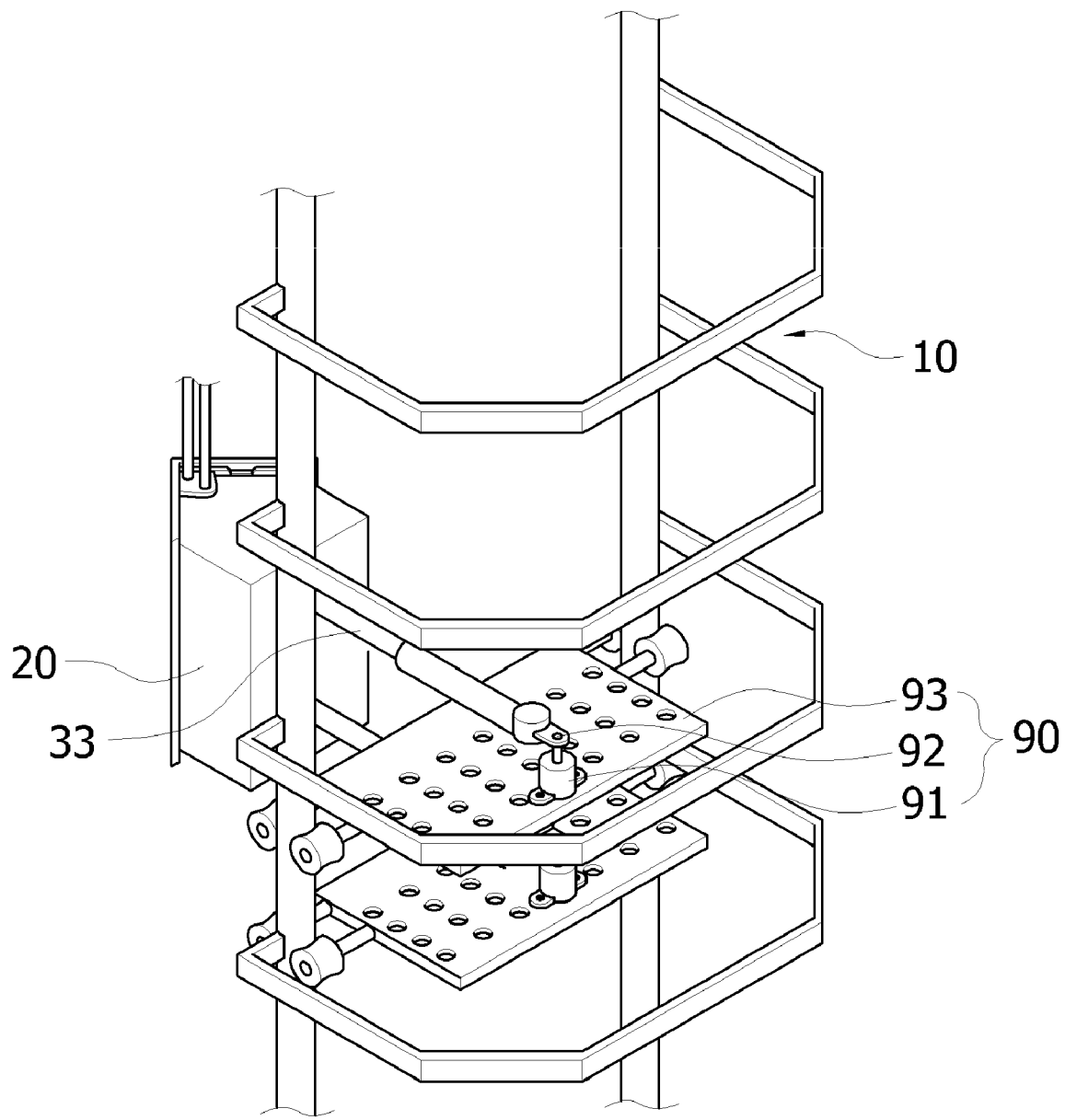
FIG. 5 is a view showing the vacuum box having a rotating unit according to the present invention.

Furthermore, the present invention may further include a rotating unit 90 which rotates the vacuum box 20 to the left or right towards the structure S1 in a diagonal direction (at an angle of θ°) with respect to the front surface of the support frame 10 such that the vacuum box 20 is brought into close contact with the wall of the structure S1 to be tested. For example, as shown in FIG. 5, the rotating unit 90 includes a high shaft 91 which is connected between the support frame 10 and the end of the second cylinder device 33 coupled to the vacuum box 20, and a motor 92 which rotates the hinge shaft 91. The motor 92 is mounted on a movable panel 93 which moves along with the vacuum box 20 upwards or downwards along the support frame 10.

Meanwhile, the present invention further includes a control unit 100 which allows the user to control the elements which move, fasten or rotate the vacuum box 20 with respect to the support frame 10 and create a vacuum in the vacuum box 20 to detect whether the structure S1 is defective, the elements including the hoist 40, the fastening unit 30, the vacuum pump 60, the drain pump 50, the position indicating unit 80 and the rotating unit 90.

In the construction described above, pipes, wires and valves which are typically provided between the elements are omitted in the drawings to more clearly describe the present invention.

The installation and operation of the non-destructive test apparatus according to the embodiment of the present invention having the above-mentioned construction will now be explained below.

First, the support frame 10 is installed adjacent to a desired portion of the structure S1 to be tested. For this, the holding part 12 provided on the upper end of the support frame 10 is hung on the hook of the crane, and, thereafter, the support frame 10 is disposed in front of the structure S1 using the crane. Subsequently, the fastening part 13 provided on the lower end of the support frame 10 approaches the fixture S2 which is around the structure S1. In this state, the first cylinder device 31 of the fastening unit 30 is operated. Then, the piston rod 31a of the first cylinder device 31 is extracted from the cylinder 31b and is brought into close contact with the wall of the structure S1. Simultaneously, the fastening part 13 is brought into close contact with the fixture S2. Thereby, the lower end of the support frame 10 is supported between the structure S1 and the fixture S2, thus firmly fastening the support frame 10 to the structure S1.

Thereafter, the vacuum box 20 is moved downwards along the guide rails 11 of the support frame 10 towards the desired portion of the structure S to be tested by operating the hoist 40. At this time, the user can observe whether the vacuum box 20 is disposed at the correct position using the position indicating unit 80. After the vacuum box 20 is disposed at the desired portion of the structure S1 to be tested, the second cylinder device 33 of the fastening unit 30 is operated to bring the vacuum box 20 into close contact with the outer wall of the structure S1. To bring the vacuum box 20 into close contact with the outer wall of the structure S1, as necessary, the orientation of the vacuum box 20 relative to the support frame 10 may be adjusted by operating the rotating unit 90 installed between the second cylinder device 33 of the vacuum box 20 and the support frame 10.

Meanwhile, in the process of bringing the vacuum box 20 into close contact with the outer wall of the structure S1, after moving the vacuum box 20 along the guide rails 11 of the support frame 10, water enters the vacuum box 20. Therefore, after the vacuum box 20 has been brought into close contact with the outer wall of the structure S1, the drain pump 50 is operated to remove water from the vacuum box 20. Furthermore, the vacuum pump 60 is operated to create a vacuum in the vacuum box 20 as soon as the removal of water from the vacuum box 20 is completed After a predetermined time period has passed, variation in the strength of the vacuum in the vacuum box 20 is measured using the vacuum gauge of the defect detecting unit 70. If the strength of the vacuum in the vacuum box 20 varies, it is determined that the structure S1 is defective.

Thereafter, to test other portions of the structure S1, the vacuum box 20 is moved upwards or downwards along the guide rails 11 of the support frame 10. The above-described process is repeated.

As described above, a non-destructive test apparatus according to the present invention can easily test whether a structure is defective or not without testing being difficult or risky, even if the structure is constructed not only on the ground in dry conditions but also in a location, for example, an underwater location or am area contaminated by radiation, to which it is difficult for a worker to get access.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A non-destructive test apparatus, comprising:
    a support frame disposed adjacent to a target structure to be tested for defects, the support frame having a vertical guide rail;
    a vacuum box moving upwards or downwards along the guide rail of the support frame, the vacuum box being attached to the target structure and creating a vacuum therein;
    a hoist provided on an upper end of the support frame to move the vacuum box upwards or downwards;
    a fastening unit fastening the support frame and the vacuum box to the target structure;
    a vacuum pump to create a vacuum in the vacuum box;
    a defect detecting unit measuring a strength of vacuum in the vacuum box to determine whether the target structure is defective; and
    a control unit to control at least one of the support frame, the vacuum box, the hoist, the fastening unit, the vacuum pump and the defect detecting unit.

2. The non-destructive test apparatus as set forth in claim 1, further comprising:
    a drain pump to remove water from the vacuum pump under control of the control unit when the vacuum pump is used under water.

3. The non-destructive test apparatus as set forth in claim 1, further comprising:
    a position indicating unit to display a position of the vacuum box moving on the support frame under control of the control unit such that a user is able to check the position of the vacuum box.

4. The non-destructive test apparatus as set forth in claim 1, wherein the fastening unit comprises:
    a first cylinder device to removably fasten the support frame to the target structure;
    a second cylinder device to removably fasten the vacuum box to the target structure; and
    a fluid pressure supply unit to supply fluid pressure to the first cylinder device and the second cylinder device.

5. The non-destructive test apparatus as set forth in claim 1, further comprising:
    a rotating unit to rotate the vacuum box leftwards or rightwards with respect to the target structure under control of the control unit.

* * * * *

UNITED STATES PATENT AND TRADEMARK OFFICE
CERTIFICATE OF CORRECTION

| | |
|---|---|
| PATENT NO. | : 8,091,440 B2 |
| APPLICATION NO. | : 12/437786 |
| DATED | : January 10, 2012 |
| INVENTOR(S) | : Young-Kuk Kim |

It is certified that error appears in the above-identified patent and that said Letters Patent is hereby corrected as shown below:

Column 3, line 46: "depending on the shape of the structure S to" should read --depending on the shape of the structure S1 to--.

Column 5, line 9: "portion of the structure S to to be tested" should read --portion of the structure S1 to to be tested--.

Signed and Sealed this
Sixth Day of March, 2012

David J. Kappos
*Director of the United States Patent and Trademark Office*